United States Patent [19]

Bloomsburg et al.

[11] 3,716,220
[45] Feb. 13, 1973

[54] TOWER VAPOR FEED SYSTEM
[75] Inventors: Marvin S. Bloomsburg, Wilmington, Del.; Don Barkley Nazzer, Port Hawkesbury, Nova Scotia, Canada
[73] Assignee: Canadian General Electric Company Limited, Toronto, Ontario, Canada
[22] Filed: March 12, 1970
[21] Appl. No.: 18,944

[52] U.S. Cl. ............... 261/36 R, 261/114 R, 261/63
[51] Int. Cl. .............................................. B01d 59/32
[58] Field of Search ..... 261/36 R, 114 R, 114 VT, 63

[56] References Cited

UNITED STATES PATENTS

| | | | |
|---|---|---|---|
| 1,986,431 | 1/1935 | Gray | 261/114 |
| 2,658,863 | 11/1953 | Guala | 261/114 |
| 2,853,281 | 9/1958 | Hibshman et al | 261/114 |
| 3,179,387 | 4/1965 | Umbricht | 261/36 |

Primary Examiner—Tim R. Miles
Attorney—Raymond A. Eckersley, Frank L. Neuhauser, Oscar B. Waddell and Joseph B. Forman

[57] ABSTRACT

A tower for counterflow contacting of downflow liquid with up-flowing gas is provided with a U-bend bottom gas entry located to trap the liquid inventory of the tower in the bend and the drain-down portion of the tower. A gas bypass connects the U-bend to the tower at a level above the drain-down level, to permit ready circulation of gas in the tower before the liquid inventory is displaced from the trap.

4 Claims, 3 Drawing Figures

PATENTED FEB 13 1973

3,715,220

*INVENTOR.*
DON. B. NAZZER.
MARVIN S. BLOOMSBURG.
BY R.A. Eckersley

TOWER VAPOR FEED SYSTEM

This invention is directed to a method of operating a fluid counterflow exchange system, and to apparatus for carrying out the method.

In liquid to gas exchange systems utilizing a tower for downward flow of liquid and upward flow of gas therethrough in intimate contacting relation, such as in the isotope exchange processes used in the preparation of heavy water, problems are encountered in establishing stable counter-flows of the two fluids, particularly after shut-down of a portion of the system.

In fluid exchange systems of this type perforated decks are commonly employed in stacked array within the exchange tower. Liquid passes downwardly through the tower from tray to tray, its flow being impeded by the upward passage of the gas through the deck perforations.

The foamed liquid flows across each of the decks and passes downwardly to the succeeding deck for return transverse flow. Thus, a fairly constant liquid inventory is retained upon the top surface of each of the decks by the upward passage of the gas therethrough. When the operation of a tower is shut down and the passage of gas is reduced or terminated the liquid inventory flows downwardly through the tower and into the gas line connected to the bottom of the tower, by means of which the gas enters the tower.

The economic and engineering significance of the problem will be better understood on appreciating that the tower may be in excess of 250 feet in height, having over 100 bubble plates of about 30 foot diameter in superposed array and being served by a gas main in the order of 36 inch diameter.

It has been found that by providing an upwardly extending U-bend in the gas supply line the entry of tower inventory liquid into the gas supply pipe can be limited to a lower portion of the upwardly extending pipe, owing to the fact that the pipe extends above the inventory level in the closed down or non-operating condition.

In order to permit the establishment of gas flow upwardly through the tower, on restarting the counterflow system a gas bypass pipe is provided to connect the gas supply pipe with the tower at a level above the close-down liquid-inventory level.

In such isotopic exchange systems the incoming gas is heated, and in restarting the system from cold considerable expansions of the gas supply pipe are experienced. By forming the gas supply pipe as an inverted U-form the pipe convolution provides flexibility to the pipe, thus obviating the need to supply alternative forms of expansion joint, which in pipes of the size under discussion are very expensive. In addition, the present invention enables the utilization of the bottom of each tower for inventory storage, which is of considerable significance both in providing such storage and in the segregation of liquid at different stages of enrichment.

The present invention thus provides a method of starting a fluid counterflow exchange system within a tower having an inventory of liquid at the bottom, a gas inlet beneath the level of the inventory and means circulating liquid downwardly through the tower, including the steps of introducing the gas into the lower end of the tower above the level of the inventory, establishing stable flow of the gas in circulating relation upwardly through the tower, and circulating the liquid downwardly through the tower in counterflow relation with the gas whereby opposed flows of the two fluids may be rapidly established in stable counterflow relation.

Thus, in a gas-liquid exchange apparatus having at least one tower with a plurality of bubble trays in stacked array for the passage of gas upwardly in intimate mixing contact with downflowing liquid, in which the inventory of liquid in the tower is maintained in the trays by the movement of the gas upwardly therethrough there is provided the improvement comprising liquid inventory retaining means having a gas supply pipe connected to the bottom of the tower for inward passage of gas to the tower, the pipe extending upwardly outside the tower to a level above the drain-down level of the tower liquid inventory to form a liquid retaining trap whereby on cessation of gas flow the passage of liquid inventory into the gas supply pipe is limited to the portion of the pipe adjacent the tower and lying below the drain-down level. In addition there is provided a gas supply bypass connecting the supply pipe with the tower at a level above the inventory drain-down level to permit ready establishment of gas circulation before the liquid is displaced from the trap.

In addition to the foregoing, the present invention also makes provision of a pipe trap of substantially inverted U-form to serve as an expansion joint whereby pipe expansion due to changes of gas pressure are accommodated by flexure of the pipe U-form.

Certain embodiments of the present invention are described, reference being had to the accompanying drawings wherein FIG. 1 is a sectional elevation of the exchange tower and fluid supply systems;

Figure 1:
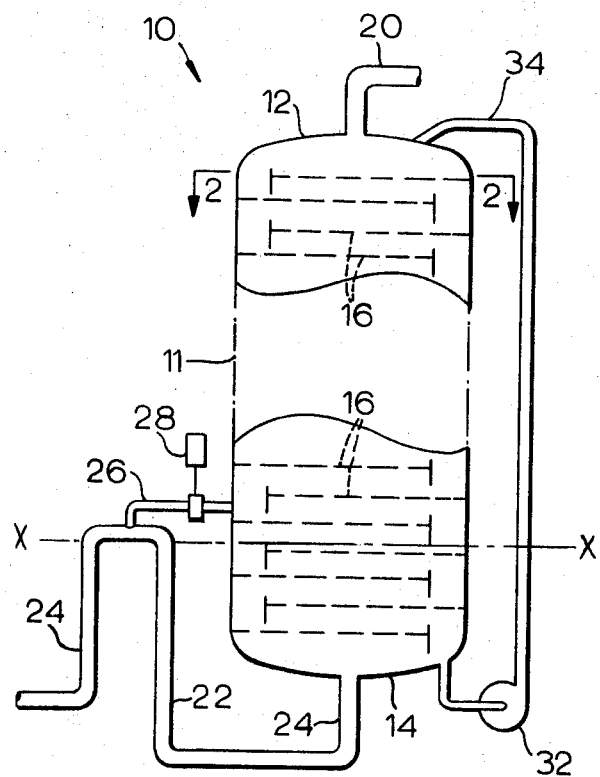

Referring initially to FIG. 1, the tower 10 comprises an elongated shell 11 having a top end cap 12 and bottom end cap 14, with a plurality of bubble trays 16 arranged in superposed relation therein.

A gas inlet 18 connects with the bottom of the tower, and a gas outlet 20 at the top of the tower.

A gas inlet downcomer 22 with an opposed leg 24 of the gas supply pipe forms in inverter U having a gas bypass 26 and control valve 28 lying above the level x—x which constitutes the drain-down level of the tower liquid inventory.

The tower liquid circulation system includes a take-off pipe 30 connecting with a pump 32 and an inlet 34 at the top of the tower.

Figure 2:
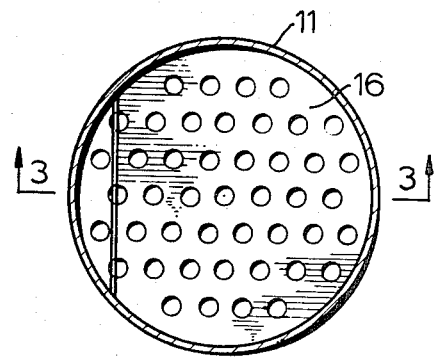
FIG. 2 is a section on the line 2—2 of FIG. 1.
Figure 3:
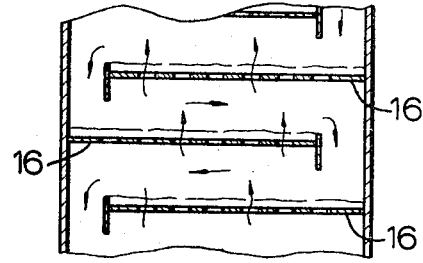
FIG. 3 is a section on the line 3—3 of FIG. 2.

Referring to FIG. 2 it will be seen that the perforated decks or bubble plates 16 have a plurality of apertures through which the gas passes upwardly in counterflow relation with the downflowing liquid, represented respectively by dotted arrows and solid arrows for gas and liquid in FIG. 3.

In operation, upon shutdown of major gas flow through the gas inlet 18 the liquid on the decks 16 flows downwardly to the bottom of the tower. It will be appreciated that provision of a pumping system sufficient to establish stable hold-up of the liquid on the decks independently of the gas flow is not economically feasible.

On starting up the system, the gas bypass control valve 28 is opened, permitting the establishment of stable gas flow upwardly through a major portion of the height of the tower, so that operation of the pump 32 at substantially its normal rating permits re-establishment of the liquid inventory upon the bubble plates or decks 16. This then clears the lower portion of the pipe 22 and the bottom of the tower to the extent that main gas flow therethrough may be established without undue back pressure on the gas compressors. As the temperature of the system rises with the inflow of the heated gas the expansion in the connecting gas pipeline is accommodated by flexure of the U-form pipe 22, 24.

Under constant operating conditions when the liquid inventory is stabilized on the decks, to substantially empty the bottom of the respective tower the control valve 28 is closed off and all of the gas passes upwardly from the bottom of the tower to pass through all of the bubble plates.

It will be appreciated that a further advantage of the present invention is the maintenance of the major portion of the gas supply trunk piping free of the liquid inventory of the towers of the system, which affords ready storage of the inventory in the respective towers. This inventory normally constitutes water at least partially enriched with deuterium, the conservation of which is highly desirable.

While the present invention is specifically directed to use in a plant for the production of deuterium, utilizing water and hydrogen sulphide for isotope exchange, it will be understood that the benefits of the invention are not so limited, and may be realized in other gas-liquid exchange processes.

We claim:

1. In a gas-liquid exchange apparatus having at least one tower with a plurality of trays in stacked array for the passage of gas upwardly in intimate mixing contact with downflowing liquid, in which the inventory of liquid in the tower is maintained in the trays by the movement of gas upwardly therethrough, the improvement comprising liquid inventory retaining means comprising a gas supply pipe connected to the bottom of the tower for inward passage of gas to the tower, said pipe extending upwardly externally of the tower in the form of a pipe trap of U-form to a level above the drain-down level of the tower liquid inventory, to form a liquid retaining trap, and a gas supply bypass connecting the gas supply pipe with the tower at a level above the inventory drain-down level, whereby liquid inventory contained within the tower and the gas supply pipe on the occurrence of drain-down may be bypassed to permit recommencement of gas circulation.

2. The apparatus as claimed in claim 1 wherein said pipe trap includes a portion above said inventory drain-down level of inverted U-form to provide an expansion joint accommodating changes due to variation in temperature by flexure thereof.

3. The apparatus as claimed in claim 1 including liquid recirculation means connecting the bottom of said tower with the top of the tower for the passage of water in pumped recirculating relation to maintain said trays full of liquid.

4. The apparatus as claimed in claim 3 wherein said gas-liquid mixing produces an isotopic exchange, said liquid being water and said gas being hydrogen sulphide.

* * * * *